May 6, 1952          E. M. BARBER          2,595,915
INTERNAL-COMBUSTION ENGINE
Filed April 18, 1947          2 SHEETS—SHEET 1
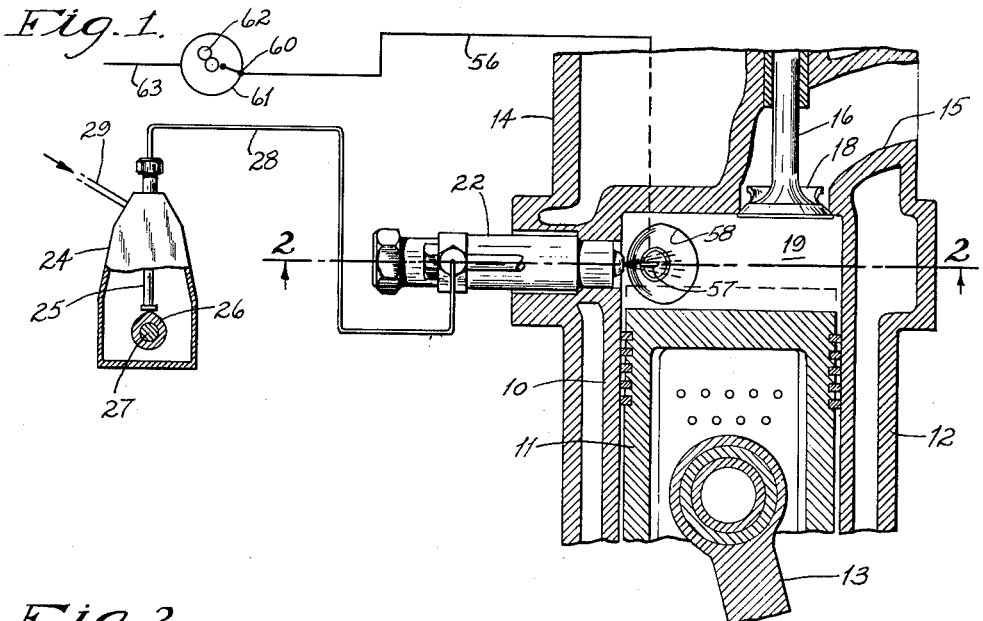
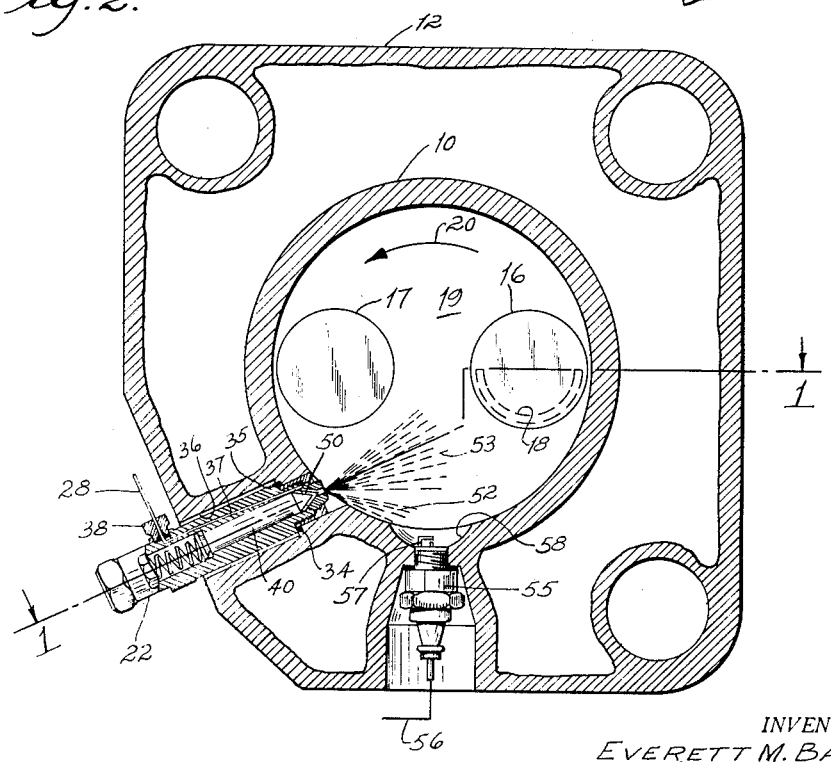
INVENTOR.
EVERETT M. BARBER
BY
ATTORNEY May 6, 1952  E. M. BARBER  2,595,915
INTERNAL-COMBUSTION ENGINE
Filed April 18, 1947  2 SHEETS—SHEET 2
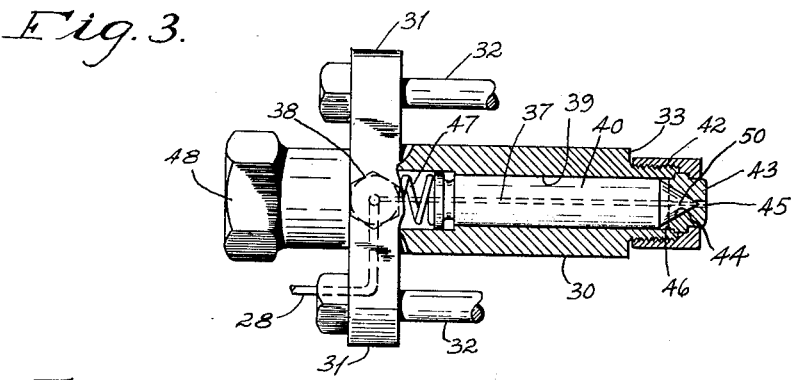
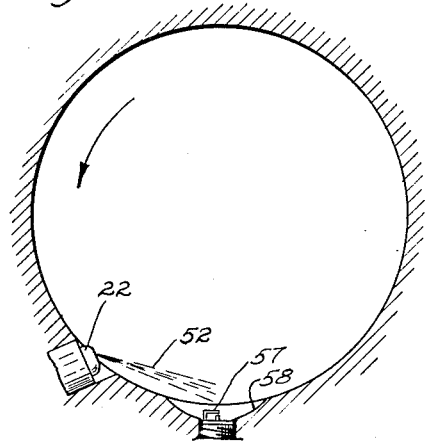
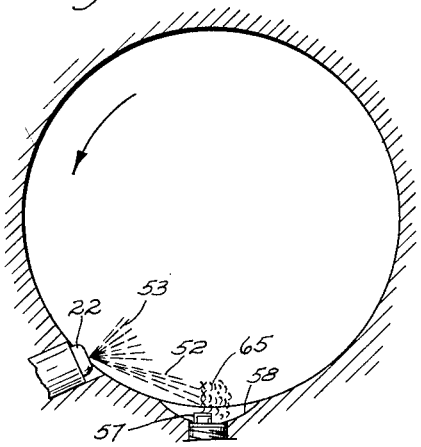
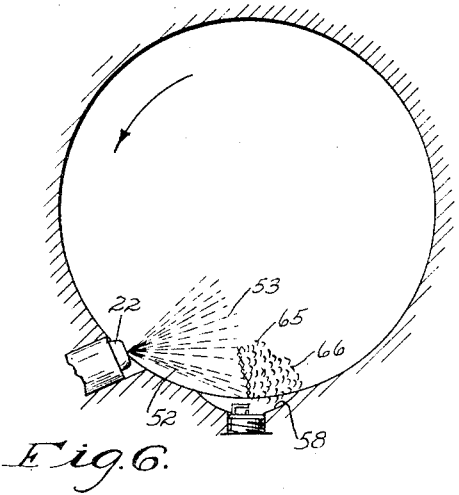
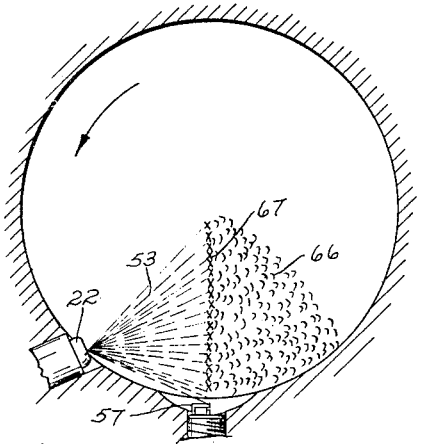
INVENTOR.
EVERETT M. BARBER
BY
ATTORNEY Patented May 6, 1952

2,595,915

UNITED STATES PATENT OFFICE 2,595,915

INTERNAL-COMBUSTION ENGINE

Everett M. Barber, Wappingers Falls, N. Y., assignor to The Texas Company, New York, N. Y., a corporation of Delaware Application April 18, 1947, Serial No. 742,275

9 Claims. (Cl. 123—32)

This invention relates to a fuel-injection spark-ignition internal combustion engine, wherein the combustion phase is independent of the spontaneous ignition quality of the fuel employed, and knocking of the engine is prevented.

In my copending application, Serial No. 10,598 (now patent No. 2,484,009, issued October 11, 1949) filed February 25, 1948, as a continuation-in-part of Serial No. 513,232, filed December 7, 1943, the latter now abandoned, there is disclosed and claimed an engine of this character wherein fuel is injected into rapidly swirling compressed air in the cylinder combustion space toward the latter part of the compression stroke, the first increment of injected fuel is spark-ignited substantially as soon as combustible fuel vapor-air mixture is formed therefrom to establish a flame front traveling counter to the direction of the air swirl, and the injection of fuel is continued into the swirling compressed air immediately in advance of the traveling flame front to progressively form additional combustible fuel vapor-air mixtures which are ignited by the traveling flame front and burned substantially as rapidly as formed. In a specific embodiment disclosed and claimed therein, fuel is injected tangentially into the combustion space in the direction of air swirl, and spark ignition of the first increment of injected fuel is secured by a spark plug mounted adjacent the injection nozzle and close to the periphery of the combustion space so as to be positioned at an edge of the spray form and in the region of diffusing fuel vapor-air mixture first produced therefrom.

The present invention is distinguished by initiating injection and ignition with a smaller pilot jet injected into the compressed swirling air so as to impregnate only a part of the compressed air present at any instant at one side of the combustion space and which swirls past the locus of injection, the first increment of said pilot jet being spark-ignited substantially as soon as combustible mixture is formed therefrom to produce a flame, and closely following initiation of the pilot jet with initiation of injection of a larger main jet into the swirling air alongside said pilot jet and on the same side of the combustion space, so as to uniformly impregnate the swirling air across said one side. The delay of initiation of the main jet after initiation of the pilot jet is such as to bring the first increment of injected fuel from the main jet adjacent the locus of ignition in combustible mixture form just after the pilot flame has been established, so that the flame rapidly spreads across the first increment of combustible mixture of the main jet to quickly establish a flame front across the path of the swirling mass on said one side of the combustion space.

In a preferred embodiment of the invention, the pilot jet is injected across a small chord of the combustion space adjacent the periphery thereof in the direction of air swirl, and the main jet is also injected in the general direction of air swirl, but more toward the center of the combustion space, so as to substantially uniformly impregnate the swirling air between said pilot jet and the center of the combustion space. Preferably, the pilot jet is soft and non-flaring and its main function is to insure prompt ignition, while the main jet is flaring and its main function is to secure adequate uniformity of impregnation of the air swirling past the locus of injection.

The present invention is further distinguished in a preferred embodiment by the provision of a recessed pocket in the cylinder communicating with the combustion space at a point adjacent the edge of the pilot jet and so as to receive combustible mixture formed from the first increment of injected fuel of the pilot jet. The spark plug is mounted in the cylinder with its electrodes positioned within said recessed pocket so that ignition of the combustible mixture therein effects a localized increase in pressure in said pocket, which produces a gun effect propelling the flame from the pocket radially across one side of the combustion space to more quickly establish the flame front.

The use of pilot injection in a diesel engine operating with compression ignition, or in a semi-diesel operating with a glow plug or spark plug and wherein the pilot jet slightly precedes the main jet to initiate combustion, has heretofore been proposed in order to reduce ignition lag with characteristic diesel combustion. The present invention is distinguished by the characteristic flame front combustion of Otto cycle engines, together with the particular relationship and arrangement of the pilot and main sprays and also the spark plug at one side of the main disc-shaped combustion space containing swirling air to accomplish the new result of more quickly establishing the flame front accross the path of the swirling air immediately after the start of fuel injection.

The use of a plurality of sprays, one of which is termed an "ignition" spray, in an engine of the Hesselman type having swirling air and spark ignition with Otto cycle combustion, has also been proposed. However, in this case, the sprays have the same injection advance, are directed in different directions so as to be dispersed in widely different parts of the combustion space and injection is complete or substantially complete prior to ignition. Also a spark ignition Otto cycle engine has been proposed in which injection starts on the compression stroke with a main spray which misses the spark plug, and an ignition spray is introduced toward the spark plug during the latter part of the injection period of the main spray and just prior to top dead center. Here again, injection is substantially complete prior to ignition. The present invention is distinguished by having initiation of the pilot jet slightly precede initiation of the main jet, with ignition of the pilot jet occurring immediately after the start of injection, to accomplish the new result of more quickly establishing the flame front across the path of the swirling air on one side of the combustion space, and by then continuing injection immediately in advance of the flame front to develop the power required on each cycle with non-knocking combustion. The invention is further distinguished by the critical relationship and coordination of the two jets and spark plug on one side of the combustion space, as heretofore defined.

In the engine of my above-mentioned application, one fuel spray is required to effect both immediate ignition at an edge of the first increment of that spray and also to effect uniform impregnation of the compressed air swirling past the locus of injection at one side of the combustion space. The requirements for a spray which will rapidly produce combustible mixture close to the nozzle for immediate ignition, and the requirements for a spray which will uniformly impregnate the swirling air across one side of the combustion space, are different and, in some particulars, are opposed to each other. Consequently, the use of a single spray for both functions necessitates a compromise between the most desirable types for the separate requirements. Moreover, particularly in large diameter cylinders, where the flame has to travel from a point of ignition at the edge of the single spray across a substantial distance or radius of rapidly swirling compressed mixture, it will be appreciated that a substantial mass of injected fuel on the far side of the spray from the ignition source may be swept by the swirling air beyond the locus of the flame front before that flame front can be established.

It is accordingly a principal object of the present invention to provide a non-knocking engine of the general character disclosed in my mentioned application Serial No. 10,598, now Patent No. 2,484,009, wherein the separate requirements for ignition of the first increment of injected fuel immediately after the start of injection, and for the uniform impregnation of the swirling air moving past the locus of injection on one side of the combustion space, are met in optimum manner by the use of a coordinated pilot spray for ignition and a main spray for uniform impregnation, while at the same time the flame front is more quickly established to avoid bypassing of substantial amounts of unburned combustible mixture past the locus of the flame front before the latter can be established.

Another object of the present invention is to provide an engine of this type in which a gun effect or propelling effect is utilized to more quickly establish the flame front across the path of swirling air at one side of the combustion space.

Other objects and advantages of the present invention will be apparent from the following description when taken in conjunction with the attached drawing and appended claims.

Referring to the drawing, which discloses a preferred embodiment of the invention:

Fig. 1 is a vertical sectional view of an engine cylinder taken on the plane of the line 1—1 of Fig. 2, with appurtenances illustrated diagrammatically and primarily in elevation;

Fig. 2 is a horizontal sectional view looking upwardly on the cylinder head and taken on the plane in line 2—2 of Fig. 1, with the fuel injection nozzle broken away and in section;

Fig. 3 is a view on an enlarged scale, partly in elevation and partly in vertical section, of the fuel injection nozzle taken on a plane at right angles to that of Fig. 2; and Figs. 4 to 7, inclusive, are diagrammatic views of the combustion space illustrating the operation taking place therein.

Referring to Figs. 1 and 2, the engine cylinder is indicated at 10 with piston 11, water jacket 12, and connecting rod 13, which runs to the usual crankshaft, not shown. The cylinder head 14 is formed with an air intake port 15 controlled by an intake valve 16, and a similar exhaust port controlled by an exhaust valve 17. The intake valve 16 is equipped with a shroud 18, which is set tangentially, so that on the suction stroke of piston 11, air is drawn into the disc-shaped combustion space 19 in a manner to impart a swirling movement of high velocity to this air within the combustion space, as indicated by the arrow 20 (Fig. 2).

This high velocity air swirl is maintained during the compression stroke of piston 11. Generally about 75 to 30° before top dead center, injection of fuel is initiated from injection nozzle 22 set tangentially of the combustion space in the direction of air swirl. Fuel injection is controlled by the usual fuel pump 24 having a plunger 25 operated by cam 26 on a cam shaft 27, which is driven in synchronism with the engine at one-half engine speed for four cycle operation in conventional manner. It will be understood that fuel pump 24 controls the time and duration of injection by supplying the fuel under high injection pressure to injection line 28 leading to nozzle 22 during the pumping stroke of plunger 25, the latter controlling communication of a feed port supplied with fuel from line 29 leading from a suitable source of supply (not shown), with either a discharge port communicating with line 28 or a spill port (not shown) which returns the fuel to the source of supply. Consequently, fuel is supplied through injection line 28 to nozzle 22 under high injection pressure during the injection period on each cycle, and thereafter the high injection pressure is relieved in said line 28 and nozzle 22.

Nozzle 22 is of a known type, such as that illustrated in Mock Patent No. 2,012,086, which is adapted to produce on each cycle a small pilot spray slightly preceding and on one side of a main spray. The construction of the nozzle is more particularly illustrated in Figs. 2 and 3. As shown, the nozzle body 30 is formed adjacent its outer end with spaced flanges 31 receiving bolts 32 which clamp the annular surface 33 of the nozzle body against a sealing gasket 34 and an annular shoulder 35 formed in the bore 36 of the cylinder. The nozzle body is formed with a longitudinal fuel channel 37 which communicates at its outer end through the coupling 38 with the injection line 28. Also formed axially of the nozzle body 30 is a bore 39 slidingly receiving a pintle valve 40.

The inner end of nozzle body 30 is formed with an exteriorly threaded smaller diameter extension receiving a clamping nut 42 holding a nozzle tip 43 securely in place against the outer end of the extension. Tip 43 is formed with a conical valve seat 44 adapted to receive the conical end of pintle valve 40, and a fuel injection port 45. The inner end of fuel channel 37 communicates with a fuel pressure chamber 46 surrounding a portion of the conical tip of pintle valve 40, so that fuel under injection pressure is adapted to move said pintle valve off its seat against the action of compression spring 47. The latter is placed between the outer end of pintle valve 40 and an adjustable cap member 48 threadedly received by the outer end of the nozzle body, so that the compression in spring 47 can be adjusted.

In order to provide the pilot jet, a small groove 50 is formed in the conical surface at one side of valve seat 44 of the tip 43. This provides free communication at all times between injection port 45 and the fuel pressure chamber 46, even when pintle valve 40 is on its seat. However, this groove is of such small size that its full discharge capacity is insufficient to prevent the rapid buildup of injection pressure in chamber 46 at the start of injection on each cycle. Consequently, at the beginning of the injection on each cycle, as controlled by pump plunger 25, a small amount of fuel first passes through groove 50 and discharges through port 45 to provide a preceding pilot jet. Immediately after the initiation of this pilot jet, the fuel pressure builds up in chamber 46 to injection pressure, causing the opening of pintle valve 40 and the initiation of injection of the main jet. In Fig. 3 the groove 50 is shown in dotted lines behind the conical tip of pintle valve 40 and in the plane of the longitudinal axis of the nozzle. In Fig. 2 this groove is shown at the upper side of the conical tip with the pintle valve 40 moved off its seat.

The position of the nozzle and groove 50 is such that the inclination of groove 50 with pintle 40 on its seat produces a directional force, causing the preceding pilot jet shown at 52 in Fig. 2 to be injected across a small chord of the combustion space adjacent the periphery thereof and in the direction of air swirl. Moreover, the relatively long pasage between the pintle valve and the seat results in the production of a pencil of non-flaring spray. However, as soon as the pintle valve is moved off its seat, then the fuel pressure acting directly on injection port 45 of relatively short length, produces a main flaring jet 53 alongside of the pilot jet 52, so as to substantially uniformly impregnate the compressed air swirling past the locus of injection on one side of the combustion space 19.

As shown, particularly in Fig. 2, a spark plug 55 having electrical lead 56, is mounted in the side wall of cylinder 10 so that the electrodes 57 are positioned within a recessed pocket 58 communicating with the combustion space 19. This recessed pocket 58 is formed in the cylinder wall closely adjacent nozzle 22 on the downstream side and in position to receive combustible mixture formed from the first increment of injected fuel of pilot jet 52. The recessed pocket is so located that the electrodes 57 are positioned within a central angle of about 20–90° and preferably about 30–45°, as formed by radii passing through the nozzle tip and the electrodes respectively. As shown diagrammatically in Fig. 1, electrical lead 56 is connected to contact 60 of a conventional distributor 61 having a rotary contact member 62 driven in synchronism with the engine. It will be understood that the distributor is part of a conventional ignition system including lead 63, whereby the timing of spark ignition can be controlled and synchronized with the timing of fuel injection on each cycle. In this manner a spark of igniting intensity is present at electrodes 57 approximately 4 to 10 crank-angle degrees following the start of fuel injection, at which time combustible fuel vapor-air mixture from the first increment of injected fuel of pilot jet 52 has reached the electrodes 57 within recessed pocket 58.

The operation of the engine is more particularly illustrated in Figs. 4–7, inclusive. Fig. 4 illustrates the point in the cycle, generally about 70 to 30° before top dead center of the compression stroke, at which fuel injection is initiated. As shown, this injection is initiated by the small non-flaring pilot jet 52, which is directed so as to avoid wetting the electrodes 57 with unvaporized liquid fuel, but so that the fuel vapor-air mixture formed from the first increment of injected fuel of that pilot jet diffuses from an edge thereof into recessed pocket 58 and into contact with electrodes 57.

Fig. 5 illustrates the next instant in the cycle, generally about 2–6 crank-angle degrees following Fig. 4, when the pintle valve 40 has been raised from its seat and initiation of injection of the main jet 53 is just beginning. At this time, the pilot jet 52 has reached the vicinity of electrodes 57 with the production of combustible fuel vapor-air mixture in pocket 58 in contact with electrodes 57, and a spark of igniting intensity has produced a flame at this point, as indicated at 65.

Fig. 6 illustrates the next instant in the cycle, wherein the first increment of injected fuel of the main jet 53 has just reached the locus of ignition with the outer edges thereof in combustible mixture form. At this time combustion of the localized mixture from pilot jet 52 within pocket 58 has produced a local increase in pressure within that pocket which propels the flame 65 inwardly across a portion of the leading edge of the main jet 53. Some combustion products from the burning of the pilot jet mixture have been swept by the swirling air somewhat beyond the locus of ignition, as indicated at 66.

Fig. 7 illustrates a somewhat later period in the cycle, wherein the propelling or gun effect has rapidly blown the flame completely across the main jet to establish the flame front indicated at 67. As shown, this flame front extends substantially across one side of the swirling mass within the combustion space from the periphery adjacent the point of ignition 57 toward the center of the combustion space. Moreover, the major portion of the fuel injection is now continuing immediately in advance of the established flame front 67, so that additional portions of fuel vapor-air mixture are progressively formed and burned substantially as rapidly as produced, while the swirling air is sweeping the products of combustion, indicated at 66, beyond the locus of the established flame front.

While in the preferred embodiment described above, the cylinder is formed with a small cavity within which the spark plug electrodes are situated to produce the gun effect, it is to be understood that this is not essential for the present invention. Thus, the spark plug may be mounted with its electrodes flush or slightly protruding from the periphery of a conventional cylinder having the usual combustion space of circular cross-section, and the pilot and main sprays arranged in the relationship previously described with respect to the said electrodes, to secure the desired formation of the flame front without by-passing of a substantial amount of unburned combustible mixture past the locus of the flame front before the latter can be established. The other advantages of the present invention relating to insuring the ignition by the pilot jet and obtaining substantially uniform air impregnation by the main jet are, of course, retained.

The present invention thus effectively separates the requirements for prompt ignition after the start of injection from the requirements for uniform impregnation of the swirling air across one side of the combustion space during the injection period. In addition, the flame front is more quickly established across the swirling mass at one side of the combustion space immediately after the initiation of injection and without danger of any substantial quantity of unburned combustible mixture being swept beyond the locus of the flame front before the latter can be established.

Obviously many modifications and variations may be made in the invention as above set forth without departing from the spirit and scope thereof, and therefore only such limitations should be imposed as are indicated in the appended claims.

What I claim is:

1. In the operation of an internal combustion engine, wherein fuel is injected into rapidly swirling compressed air in the cylinder combustion space toward the latter part of the compression stroke, the first increment of injected fuel is electrically ignited substantially as soon as combustible fuel vapor-air mixture is formed therefrom to establish a flame front traveling counter to the direction of air swirl, and the injection of fuel is continued into the swirling compressed air immediately in advance of the traveling flame front to progressively form additional combustible fuel vapor-air mixtures which are ignited by the traveling flame front and burned substantially as rapidly as formed; the improvement which comprises initiating injection on each cycle with a smaller pilot jet directed into the swirling air so as to impregnate only a part of the compressed air present at any instant at one side of the combustion space and which swirls past the locus of injection, immediately electrically igniting the resulting combustible fuel vapor-air mixture from the first increment of injected fuel of said pilot jet substantially as soon as formed to produce a flame, closely following initiation of injection of said pilot jet with initiation of injection of a main larger jet into the swirling air alongside said pilot jet on one side of the combustion space so as to substantially uniformly impregnate the swirling air across said one side of the combustion space, the delay of initiation of the main jet after initiation of the pilot jet being such as to bring the first increment of injected fuel from the main jet adjacent the locus of ignition just after the pilot flame has been produced and substantially as soon as combustible fuel vapor-air mixture has been formed from the first increment of injected fuel of said main jet, whereby the flame rapidly spreads across said last mentioned combustible mixture to establish a flame front across the path of the swirling mass on said one side of the combustion space without movement of any substantial quantity of unburned combustible mixture past the locus of the flame front before the latter can be established, and then continuing injection on said cycle immediately in advance of the established flame front to develop the power required.

2. The method according to claim 1, wherein the pilot jet is injected in the direction of air swirl adjacent the periphery of the combustion space, the main jet is also injected in the direction of air swirl so as to impregnate the swirling air between said pilot jet and the center of the combustion space, and the pilot jet is electrically ignited less than 90° of swirling movement from the locus of injection.

3. The method according to claim 1, wherein the pilot jet is injected so that at least a portion of the combustible fuel vapor-air mixture first formed therefrom passes into a recessed pocket in the periphery of the combustion space, and said combustible mixture is electrically ignited in said recessed pocket to produce a gun effect to more rapidly propel the flame across the path of the swirling mass on said one side of the combustion space.

4. The method according to claim 1, wherein the pilot jet is injected from the periphery of the combustion space as a non-flaring jet across a small chord of the combustion space adjacent the periphery thereof and in the direction of air swirl, with at least a portion of the combustible fuel vapor-air mixture first formed from said jet passing into a recessed pocket in the periphery of the combustion space about 20–60° of swirling movement from the locus of injection, the main jet is injected from approximately the same locus of injection at the periphery of the combustion space as a flaring jet in the direction of air swirl to substantially uniformly impregnate the balance of the swirling air passing between said pilot jet and the center of the combustion space, and the combustible mixture formed from the first increment of injected fuel of said pilot jet is spark-ignited in said recessed pocket to produce a gun effect to more rapidly propel the flame across the path of the swirling mass on said one side of the combustion space.

5. In an internal combustion engine having a power cylinder and a piston operating therein providing a disc-shaped combustion space, the combination of air intake means for said cylinder adapted to introduce air into said combustion space and impart a high velocity of swirling movement therein, fuel injection means carried by said cylinder having a pilot injection port and a main injection port opening directly into said main disc-shaped combustion space, means synchronized with engine operation for initiating injection toward the latter part of the compression stroke of said piston of first a smaller spray from said pilot port into only a part of the compressed air present at any instant on one side of said combustion space and swirling past said port, and then a larger main spray from said main port alongside of said pilot spray so as to substantially uniformly impregnate the swirling air moving past said injection ports at said one side of the combustion space, electrical ignition means carried by said cylinder close to said ports and positioned adjacent an edge of said pilot spray in position to be contacted by combustible fuel vapor-air mixture formed from the first increment of injected fuel from said pilot port, means synchronized with engine operation for actuating said electrical ignition means promptly after the start of pilot injection and when said last-mentioned combustible mixture contacts said electrical ignition means to thereby produce a flame, said fuel injection means being constructed to provide sufficient lag between the initiation of said pilot and main injections so that the first increment of injected fuel from the main spray port has just reached a point adjacent the locus of ignition in combustible mixture form at the time the said pilot flame has been established, whereby the flame spreads across the leading edge of said last-mentioned combustible mixture of the main spray to establish a flame front across the path of the swirling mass on said one side of the combustion space, said injection means then continuing injection immediately in advance of said flame front on said cycle to develop the power required.

6. An internal combustion engine according to claim 5, wherein said fuel injection means comprises a nozzle mounted in the cylinder at the periphery of the combustion space, having a pilot port directed across a small chord of the combustion space adjacent the periphery thereof and in the direction of air swirl and constructed to produce a non-flaring spray, and a main port directed in the general direction of air swirl, but more toward the center of the combustion space and constructed to produce a flaring spray alongside said pilot spray, and wherein said electrical ignition means is a spark plug mounted in the cylinder wall with its electrodes adjacent the periphery of the combustion space on the air downstream side of said nozzle and at the edge of said pilot spray, so as to be contacted by combustible mixture formed from the first increment of injected fuel of said pilot spray.

7. An interval combustion engine according to claim 5, wherein said power cylinder is formed with a recessed pocket communicating with said disc-shaped combustion space at the edge of said pilot spray and in position to receive combustible mixture formed from the first increment of injected fuel of said pilot spray, and said electrical ignition means is mounted in the cylinder and positioned in said recessed pocket so that ignition of combustble mixture in said pocket produces a gun effect propelling the flame rapidly across the said combusible mixture formed from the first increment of the main spray to thereby quickly establish the said flame front without movement of any substantial amount of unburned combustible mixture past the locus of the flame front before the latter can be established.

8. An internal combustion engine according to claim 5, wherein said fuel injection means comprises a nozzle mounted in the cylinder wall at the periphery of the combustion space, having a pilot port directed across a small chord of said combustion space adjacent the periphery thereof and in the direction of air swirl and constructed to produce a non-flaring spray, and a main port directed in the general direction of air swirl but more toward the center of the combustion space and constructed to produce a flaring spray alongside said pilot spray, with said cylinder having a recessed pocket communicating with said disc-shaped combustion space at the periphery thereof, and on the air downstream side of said nozzle and close to the latter so as to receive combustible mixture formed from the first increment of injected fuel of said pilot spray, and said electrical ignition means is a spark plug mounted in said cylinder with its electrodes in said recessed pocket so that ignition of combustible mixture in said pocket produces a gun effect propelling the flame rapidly across the combustible mixture from the first increment of injection of the main spray to quickly establish the said flame front without movement of any substantial amount of unburned combustible mixture past the locus of the flame front before the latter can be established.

9. In an internal combustion engine having a power cylinder and a piston operating therein providing a combustion space, the combination of a fuel injection nozzle mounted in the wall of said cylinder, a spark plug mounted in the wall of said cylinder less than 90° of angular movement around said cylinder from said fuel injection nozzle, the latter having a pilot port constructed to inject a non-flaring fuel jet across a small chord of said combustion space adjacent the periphery thereof between said nozzle and said spark plug in a plane generally perpendicular to the longitudinal axis of said cylinder, said nozzle also having a main port constructed to inject a flaring fuel jet alongside said pilot jet and between the latter and the center of the combustion space on the same side of the latter and also in a plane generally perpendicular to the longitudinal axis of the cylinder, means providing a small injection lag between the initiation of injection from said pilot port and the initiation of injection from said main port, and means synchronized with engine operation for igniting the first increment of injected fuel from said pilot port as the latter reaches the locus of said spark plug.

EVERETT M. BARBER.

REFERENCES CITED

The following references are of record in the file of this patent:

UNITED STATES PATENTS

| Number | Name | Date |
|---|---|---|
| 1,767,701 | Riehm | June 24, 1930 |
| 1,967,243 | Hesselman | July 24, 1934 |
| 2,012,086 | Mock | Aug. 20, 1935 |
| 2,100,143 | Mock | Nov. 23, 1937 |
| 2,125,293 | Hesselman | Aug. 2, 1938 |
| 2,315,907 | Starr | Apr. 6, 1943 |
| 2,457,652 | Fisher | Dec. 28, 1948 |
| 2,484,009 | Barber | Oct. 11, 1949 |

OTHER REFERENCES

The Pennsylvania State College Bulletin, The School of Engineering, technical bulletin No. 16, Proceedings of the Sixth Oil Power Conference held at The Pennsylvania State College, June 8 to 11, 1932, dated April 22, 1933, pp. 3–19, "Heating Fuels for Injection Engines," by Edward Adams Richardson.